United States Patent [19]
Bartlo et al.

[11] 3,835,526
[45] Sept. 17, 1974

[54] METHOD OF FORMING TAPERED METAL PIECES

[75] Inventors: Louis J. Bartlo, Youngstowm; Howard B. Bomberger, Jr., Canfield, both of Ohio

[73] Assignee: RMI Company, Niles, Ohio

[22] Filed: Apr. 9, 1973

[21] Appl. No.: 349,586

Related U.S. Application Data

[63] Continuation-in-part of Ser. No. 112,160, Feb. 3, 1971, abandoned.

[52] U.S. Cl. ................... 29/470.9, 29/475, 29/480
[51] Int. Cl. .................................................. B23k 1/20
[58] Field of Search .......... 29/470.9, 475, 480, 482; 83/4

[56] References Cited
UNITED STATES PATENTS

| 977,012 | 11/1910 | House | 83/4 X |
|---|---|---|---|
| 1,926,320 | 9/1933 | Trembour | 29/470.9 |
| 2,742,076 | 4/1956 | Klein | 29/480 X |
| 3,331,121 | 7/1967 | DeMaris et al. | 29/475 |
| 3,540,117 | 11/1970 | Kennedy et al. | 29/470.9 X |
| 3,602,978 | 9/1971 | Oaks | 29/480 X |
| 3,660,882 | 5/1972 | Widowitz et al. | 29/480 X |

*Primary Examiner*—Richard B. Lazarus
*Attorney, Agent, or Firm*—Walter P. Wood

[57] ABSTRACT

A method of forming tapered metal pieces particularly applicable to titanium. A block of the metal of uniform thickness is sawed or otherwise cut to form two wedge-shaped segments. The cut surfaces of the segments are coated with a parting compound and placed against each other. The segments are joined with a weld which extends around their abutting edges, forming a pack of uniform thickness. The pack is forged to dimensions such that it can be carried on a roller conveyor, and hot worked, after which the segments are separated.

4 Claims, 6 Drawing Figures

PATENTED SEP 17 1974  3,835,526
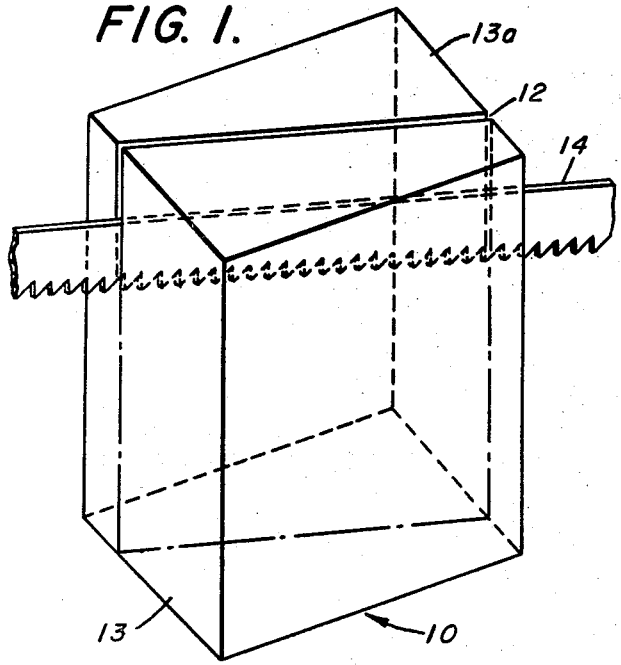
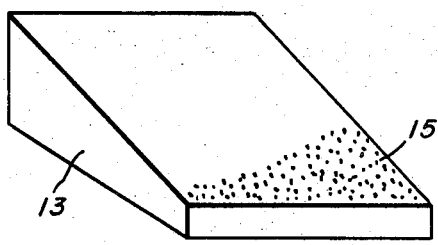
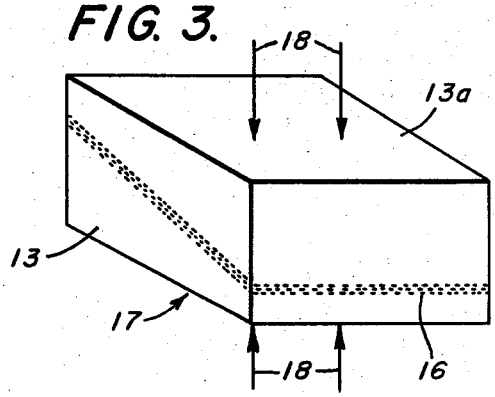
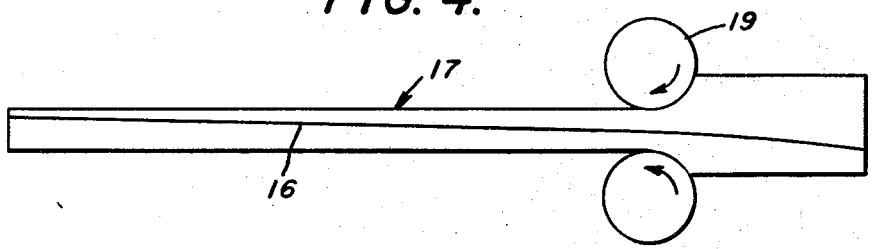
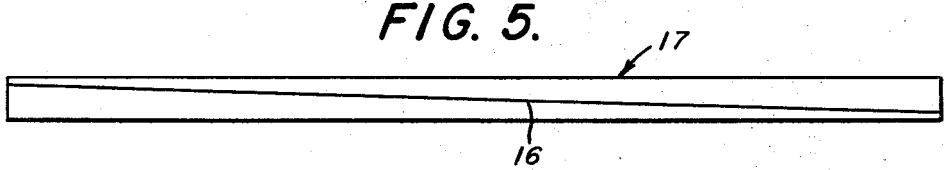
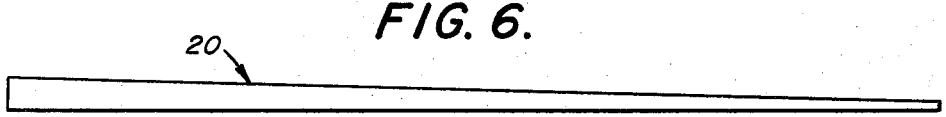
INVENTORS.
LOUIS J. BARTLO &
HOWARD B. BOMBERGER, JR
By Walter P. Wood
Attorney

METHOD OF FORMING TAPERED METAL PIECES

This application is a continuation-in-part of our earlier application Ser. No. 112,160 filed Feb. 3, 1971 (now abandoned).

This invention relates to an improved method of forming tapered metal pieces.

Although the invention is not thus limited, our method is particularly useful as applied to the production of large size tapered pieces of titanium. As used herein, the term "titanium" includes the various titanium-base alloys, as well as unalloyed titanium metal. There is a growing need for large size tapered sheets and plates of high-strength titanium in modern high-performance aircraft. For example, one type of aircraft requires plates for wing planks up to 302 inches long, the width of which tapers from 74 to 34 inches and the thickness from 0.625 to 0.125 inch. Another aircraft requires pieces as large as 42 inches wide, 600 inches long and of a thickness which tapers from 0.375 to 0.060 inch.

Current requirements for tapered titanium pieces usually are met by extensive chemical and mechanical milling of plates and sheets of uniform width and thickness, or milling of pieces which have been forged to a tapered configuration. Such methods not only involve high-cost operations, but are wasteful of a premium material. Another method of forming tapered titanium plates is shown in Klimmek et al U.S. Pat. No. 3,533,156, wherein a number of sheets of graduated length are placed together against a steel dummy to form a pack which is hot-rolled to weld the sheets together. Mills for direct-rolling of tapered pieces of other metal, such as aluminum, are known, but are not readily used for titanium, since much higher temperatures and mill loads are encountered. It is known also to cast tapered bodies and hot-roll them, as shown in Trembour U.S. Pat. No. 1,926,320 or Kennedy et al U.S. Pat. No. 3,540,117, but as far as we are aware these methods have not been applied to titanium.

An object of our invention is to provide an improved method of forming tapered metal pieces, which method is applicable to titanium, but is simpler, less costly and less wasteful of material than methods used heretofore.

A further object is to provide a method of forming tapered pieces of titanium in large sizes, for example of at least 48 inches in length, 24 inches in width and 0.04 inch thick at the end of greater thickness.

A more specific object is to provide a method which affords the foregoing advantages and in which we saw or otherwise cut a metal block of uniform thickness into two wedge-shaped segments, form a pack of the two segments temporarily joined around their cut surfaces, work the pack until both segments assume the desired tapered configuration, and separate the segments at their cut surfaces.

In the drawings:

FIG. 1 is a diagrammatic perspective view of a metal block undergoing cutting in accordance with our invention;

FIG. 2 is a perspective view of one of the wedge-shaped segments which results from cutting the block shown in FIG. 1;

FIG. 3 is a perspective view of a pack formed by joining two segments of the configuration shown in FIG. 2;

FIG. 4 is a diagrammatic side elevational view of a pack undergoing rolling;

FIG. 5 is a side elevational view of the pack after rolling; and

FIG. 6 is a side elevational view of a tapered piece obtained by separating the segments of the rolled pack.

FIG. 1 shows a metal block 10 which is of uniform thickness. Preferably the block is relatively short and thick to minimize the area which must be sawed or otherwise cut. Ideally the block may be a perfect cube. The metal may be titanium, and the block may be obtained by conventional forging or otherwise working of an ingot. In accordance with our invention, we cut the block on a plane 12 into two wedge-shaped segments 13 and 13a, one of which is shown in FIG. 2. We may use any suitable conventional saw 14 or other abrasive cutting device, but preferably one which, as it cuts, wastes a minimum of material from the block. If the cut surfaces are not smooth, we may machine them to obtain the necessary smoothness, but such machining is minimal and does not appreciably alter the dimension of the segments. Next we coat the cut surface of one or both segments with particles 15 of a parting compound. Our preferred parting compound is powdered aluminum oxide, but we may use other materials, such as the powdered oxides of calcium, titanium, magnesium or zirconium. We may apply the parting compound to the segment by a known flame spray process, or as a slurry suspended in a suitable vehicle, such as alcohol and water. We place the cut and coated surfaces of the segments against each other as shown in FIG. 3, and join the segments with a weld 16 which extends around their abutting edges, thus forming a pack 17 of uniform thickness.

We heat the pack to a suitable working temperature, commonly about 1,700° to 2,000°F in the example of titanium. In most instances the dimensions of the pack are too small to permit the pack to be carried on the usual roller conveyor which carries pieces to a roll stand. Hence we may forge the pack to increase at least one of its dimensions. In the forging operation we may lengthen the pack, as indicated by arrows 18 in FIG. 3, and/or widen it if it is to be cross-rolled. We roll the heated pack 17 in a conventional roll stand 19, indicated diagrammatically in FIG. 4. We may pass the pack through the rolls as many times as needed and either lengthwise or crosswise to reduce the pack to a thickness such that the segments will be of the desired thickness after they are separated. The configuration of the rolled pack is approximately as shown in FIG. 5. We flatten, anneal and otherwise condition the pack as needed to obtain the desired properties in the finished piece as known in the art.

We flame cut or shear off the weld 16, after which we separate the segments to form tapered pieces 20, one of which is shown in FIG. 6. Finally, we grind, pickel or machine the tapered pieces to their ultimate dimensions, but the material lost in machining is minor compared with the loss in machining a piece of uniform thickness.

Our method is particularly useful for forming tapered pieces of titanium of larger sizes. As a minimum, the final product illustrated in FIG. 6 has dimensions on the order of 48 inches in length, 24 inches in width, and 0.04 inch thick at the end of greater thickness. The dimensions may range from these magnitudes up to and beyond those of the pieces required for aircraft hereinbefore listed as examples.

From the foregoing description, it is seen that our invention affords a simple economical method of forming tapered pieces of metal, such as titanium, which are difficult to roll directly to a tapered configuration. Our method requires no special equipment, but can be practiced with conventional equipment available at most rolling mills. We intend the term "saw," as used herein, to include any equivalent cutting device, such as an abrasive cut-off wheel.

We claim:

1. A method of forming tapered pieces of titanium, which pieces have final minimum dimensions on the order of 48 inches in length, 24 inches in width, and 0.04 inch in thickness at the end of greater thickness, said method comprising:

cutting a relatively short thick block of the titanium of uniform thickness into two wedge-shaped segments;

coating the cut surface of at least one of said segments with a parting compound;

placing the cut surface of one such segment on the cut surface of another such segment with the two cut surfaces separated by said parting compound;

joining said segments with a weld which extends around their abutting edges, thus forming a pack of uniform thickness;

forging said pack to enlarge at least one dimension of its length and width, whereby the pack of enlarged dimension can be carried on a roller conveyor;

carrying said pack on a roller conveyor to a roll stand;

hot-rolling said pack; and separating the segments from the rolled pack.

2. A method as defined in claim 1 in which said pack is rolled both lengthwise and crosswise, and is forged to widen it as well as to lengthen it.

3. A method as defined in claim 1 in which said parting compound is selected from the group which consists of powdered oxides of aluminum, calcium, titanium, magnesium and zirconium.

4. A method as defined in claim 1 in which said block is a cube.

* * * * *